United States Patent [19]

Grantham et al.

[11] Patent Number: 5,582,706
[45] Date of Patent: Dec. 10, 1996

[54] ELECTROSEPARATION OF ACTINIDE AND RARE EARTH METALS

[75] Inventors: LeRoy F. Grantham, Calabasas; Jerold Guon, Woodland Hills; David L. Grimmett, Simi Valley; Lowell R. McCoy, Woodland Hills; Jeffery J. Roy, Newbury Park, all of Calif.

[73] Assignee: Rockwell International Corporation, Seal Beach, Calif.

[21] Appl. No.: 458,527

[22] Filed: Jun. 2, 1995

[51] Int. Cl.$^6$ .................................................. C25C 3/34
[52] U.S. Cl. ............................................................ 205/43
[58] Field of Search ........................... 204/1.5, 292, 293, 204/294; 205/43

[56] References Cited

U.S. PATENT DOCUMENTS

| | | | |
|---|---|---|---|
| 4,399,108 | 8/1983 | Krikorian et al. | 423/5 |
| 4,596,647 | 6/1986 | Miller et al. | 204/212 |
| 4,880,506 | 11/1989 | Ackerman et al. | 204/1.5 |
| 4,892,684 | 1/1990 | Harp | 252/626 |
| 5,041,193 | 8/1991 | Grantham | 204/1.5 |
| 5,096,545 | 3/1992 | Ackerman | 204/1.5 |
| 5,268,084 | 12/1993 | McCoy et al. | 204/290 R |
| 5,348,626 | 9/1994 | Miller et al. | 204/1.5 |
| 5,454,914 | 10/1995 | Gay et al. | 204/1.5 |

*Primary Examiner*—Ngoclan Mai
*Attorney, Agent, or Firm*—George A. Montanye; Harry B. Field; Henry Kolin

[57] ABSTRACT

A pyrochemical process is utilized to recover 99% of the remaining transuranium materials from plutonium-uranium extraction waste. One step of the overall pyrochemical process involves the electrochemical separation of the waste components. A solid anode and a solid cathode are used in this electrochemical separation step to electrorefine in single or multiple steps. The solid anode and solid cathode are selected from certain preferred anodic and cathodic materials. Where multiple electrorefining steps are used to obtain more complete electroseparation, this is achieved by employing in the multiple electrorefining steps both a solid anode, suitably graphite, and a molten metal anode containing a mixture of the actinide and rare earth elements. This results in greater separation than can be realized through electroseparation by use of either anode alone.

6 Claims, No Drawings

ELECTROSEPARATION OF ACTINIDE AND RARE EARTH METALS

BACKGROUND OF THE INVENTION

1. Field of the Invention

This invention relates to the pyrochemical processing of nuclear waste products. It particularly relates to the achieving of high efficiencies in the electroseparation of actinide and rare earth metals.

2. Background Information

A pyrochemical process has been proposed to recover 99% of the remaining transuranium (TRU) materials (Np, Pu, Am, Cm) from plutonium-uranium extraction (PUREX) waste to simplify nuclear waste management and reduce the cost involved. The high-level PUREX nuclear waste is separated into a TRU-rich stream and a TRU-depleted stream. The TRU-rich stream could be stored indefinitely or, if sufficiently pure, could be fissioned in a fast reactor or accelerator or similar device to thereby convert a large fraction of the waste to a low-TRU high-level waste (HLW). After storage of the depleted TRU HLW for a period of time to allow the fission products to decay to low levels, this waste could be disposed of as low-level waste (LLW) thus substantially reducing disposal costs compared to those involving TRU-rich waste.

Many processes have been proposed for reprocessing and separating spent nuclear fuels. See for example, U.S. Pat. Nos. 4,399,108, 4,880,506, and 4,892,684. In U.S. Pat. No. 5,041,193, a pyrochemical process is utilized for recovering actinide metals from spent nuclear fuel oxides. This pyrochemical process includes electrorefining the metal complex from an anode by electrolytically oxidizing actinides into a salt and electrodepositing actinides onto a cathode to form an actinide metal deposit. The actinide metal deposit is then melted to separate the salts and the actinide metals.

In order to achieve the desired economies in the use or disposal of the nuclear waste products, it is essential that high efficiencies be achieved in the electrochemical separation of actinide and rare earth metals as part of the pyrochemical process.

It is, therefore, an object of the present invention to provide an improved electrochemical process utilizing a molten salt electrolyte for the more complete electroseparation of actinide and rare earth elements.

It is a further object to provide an improved electrochemical process which may be utilized in conjunction with other chemical or electrochemical processing steps to further enhance such more complete electroseparation.

SUMMARY OF THE INVENTION

In general, the pyrochemical separation of actinides and various rare earth elements derived from reprocessed spent nuclear fuel offers economic advantages over other methods of disposal or reuse of these elements. One step of the overall pyrochemical process involves the electrochemical separation (electrorefining) of these waste components.

In its broadest aspects, the present invention uses at least a solid anode and a solid cathode in the electrochemical separation step to electrorefine in single or multiple steps. Where multiple electrorefining steps are used to obtain more complete electroseparation, this may be achieved by employing in the multiple complete electroseparation, this may be achieved by employing in the multiple operation steps both a solid anode, suitably an inert anode such as graphite, and a molten metal anode containing a mixture of the actinide and rare earth elements. This achieves greater separation than can be realized through electroseparation with either anode alone.

The sequential electroseparation process involving multiple electrorefining steps may employ the solid cathode together with either the solid anode or the molten metal anode in the first step. However, it is an essential feature of the present invention that both a solid anode and a solid cathode be used during the electrorefining, whether in a single separation step or as part of multiple sequential operations.

The use of a solid anode, e.g., graphite, is particularly advantageous when the material being electrorefined is already dissolved in the electrorefining medium, such as a molten salt. While a solid anode may be used in each of the multiple steps, using a molten metal anode, e.g., Cd, Bi, Zn, Sn, or various molten metal alloys, during one of the steps is advantageous during electrorefining, particularly when the molten metal is used as a solvent for the materials being electrorefined.

DESCRIPTION OF PREFERRED EMBODIMENTS

The present invention finds its principal utility in the treatment of plutonium-uranium extraction (PUREX) waste by a proposed pyrochemical process which includes an electrorefining step. In this pyrochemical process the long-lived actinides present in the nuclear waste are separated from the rare earth metals for conversion of these actinides into short-lived fission products. This process involves six basic steps to convert the aqueous metal nitrates (including the actinides) present in the PUREX waste to metal chlorides, and then separating the actinides as metals from the chloride salt. In the proposed pyrochemical partitioning process, (1) the PUREX nuclear waste residue solution is microwaved, denitrated, and converted to a solidified oxide.
(2) This oxide is then chlorinated.
(3) The chlorinated residue is next dissolved in a LiCl-KCl molten salt.
(4) It is then chemically partitioned to separate out at least 99% of each actinide (U, Np, Pu, and Am) into an actinide-rich product. This partitioning step consists of LiCd reduction where the actinides along with some rare earths are reduced to metals dissolved in the molten Cd.
(5) This is followed by electrochemical partitioning (electrorefining) where the actinides are separated from the rare earths by electrochemically transferring the actinides from the molten Cd through an electrolyte (LiCl-KCleutectic) and depositing the actinides on a solid cathode (Ta, Fe, U).
(6) The final step involves processing the residue waste to a non-TRU waste form.

The present invention is particularly directed to an improvement in the electrochemical partitioning step (step 5) of the overall pyropartitioning process. It has now been shown that by using at least a solid anode and a solid cathode in the electrochemical separation step, more than 99% of each actinide (U, Np, Pu, and Am) can be stripped from the molten metal anode, with most of the actinides stripped from the molten metal being deposited on the cathode (i.e., Ta, Fe and uranium-coated tantalum). However, at the end of the molten metal stripping, 15–30% of the actinides (depending on the initial concentrations of rare earths and/or actinides in the salt) remains in the salt. These actinides are then stripped from the salt using a solid anode (lithium aluminide (LiAl), lithium antimonide (Li$_2$Sb), iron, graphite or lanthanum).

The cell design ordinarily utilized for the test generally provides for the solid anode to be located outside of the main electrochemical refining cell. Thereby the anodized products or the anode, itself, cannot interfere with the electrorefining actions. In one cell design, a 12.7 mm tantalum tube is used as the primary cell component. This tube contained a liquid cadmium anode, a small 1 mm tantalum wire stirrer and a solid 1 mm tantalum cathode surrounded by a 6.4 mm Ta tube with a window in it to catch any nonadherent deposits. The 12.7 mm tube had an ionic induction hole drilled in it leading to the larger outside compartment.

Where use of a graphite anode and iron cathode is contemplated, it is considered that iron would not make a good anode co-located with the cathode since it would immediately plate out at the cathode in preference to actinides once it is dissolved electrochemically from the anode. In contrast, the rare earth metals (particularly Y and La) make effective anodes because once dissolved electrochemically from the anode, they preferentially remain in the salt while the actinides are deposited electrochemically at the cathode.

Use of iron as an anode requires it to be located in a separate anode compartment in a LiCl-KCl molten salt. The relative number of Li+ and Fe++ atoms in the salt in the separate compartment would predominantly allow Li+ ions to carry the current into the cathode compartment and substantially reduce the Fe deposition at the cathode.

The following examples illustrate the practice of one or more aspects of this invention. However, they should not be construed as limitations on the scope thereof.

EXAMPLE 1

Stripping Actinides from Cd Anodes Using Molten Cd as the Anode and a Solid Cathode The purpose of this series of tests was to illustrate a standard electrorefining separation test utilizing uranium and the rare earths in their PUREX proportions followed by removal of UCE$_3$ (NpCl$_3$. PuCl$_3$ and/or AmCl$_3$ and AmCl$_2$) from their molten salt. Both the data from the Cd anode-Ta cathode electrorefining and the final removal of the uranium using a Li$_2$Sb anode are presented. The last three depositions (after about 95 coulombs had been passed through the cell) were the tests using a Li$_2$Sb anode to remove the U (Np, Pu, Am) from the salt after the U (Np, Pu, Am) had been removed from the Cd anode.

In all of these tests, it was demonstrated that over 98% of each actinide (except Pu where the analytical instrument was not sensitive enough) could be electrorefined from the Cd anode in the electrochemical cell. In most of these tests (about 10), solid Ta cathodes were used for the total actinide deposit. In one test each, solid Fe wire or Ta wire coated with U was used to demonstrate that other cathodic materials could also be used.

Table 1 illustrates the results obtained.

TABLE 1

STRIPPING ACTINIDES FROM Cd ANODES FOLLOWED BY STRIPPING THE REMAINING ACTINIDES FROM THE SALT

|  | U | Np[a] | Pu | Am |
| --- | --- | --- | --- | --- |
| Initial Wt. Actinide Added (mg) | 66.2 | 12.8 | 1.4 | 10.2 |
| Actinide Removal from Cd | 98[c] | 98.7 | >96[b] | 99 |

TABLE 1-continued

STRIPPING ACTINIDES FROM Cd ANODES FOLLOWED BY STRIPPING THE REMAINING ACTINIDES FROM THE SALT

|  | U | Np[a] | Pu | Am |
| --- | --- | --- | --- | --- |
| Anode (%) |  |  |  |  |
| Actinide Removal from System Using |  |  |  |  |
| Li$_2$Sb Anode (%) | 99.4 | 99 | >95[b] | 99 |
| Graphite Anode (%) | 98.2 |  |  |  |
| Iron Anode (%) | 98.7 |  |  |  |
| Rare Earth Anodes (%) | 98.0 | 99 | >95[b] | 99.3 |

[a]Pr omitted in Np tests to avoid overlap or Pr—Np peaks during analysis.
[b]Removal was grater; limit of analytical detection.
[c]When a solid Ta cathode coated with U was used, 99% U was removed; when a solid iron cathode was used, 97% U was removed.

EXAMPLE 2

Use of Solid Anodes to Strip Actinides from the Salt

After about 99% of each actinide was stripped from the Cd anode in the tests shown in Example 1, essentially the remainder of the actinide in the system was stripped from the salt using principally the Li$_2$Sb solid anode outside the cell. LiAl, graphite, Fe and rare earth solid anodes were also used. In general, the solid anode was located in the salt surrounding the electrochemical cell.

In these tests, about 15–30% of the initial amount of actinide present in the system remained in the salt when the salt stripping tests were begun. In all cases except for Pu (where the analytical instrument was not sensitive enough), it was demonstrated that essentially all of the remaining actinide in the system was stripped from the salt.

In the tests where different solid anodes were used (five U tests and one or more of Np, Pu and Am tests), the salt was initially stripped using the solid Li$_2$Sb anode. About 15% of the actinide initially present was added back to the cell as actinide chloride and the salt was re-stripped using a different anode (see Table 1). Again, except for Pu, it was demonstrated that essentially all of the actinide could be stripped from the salt. These tests verified that all of the different anodes gave essentially identical results, i.e., the various anodes were equally effective in removing actinides from the salt. Greater than 99% removal of Pu could not be verified since the analytical limit of detection was only about 95%.

EXAMPLE 3

Further Use of Solid Anodes to Strip the Actinides from Salt

Salt solutions of ~1 wt. % actinide, Gd and Nd were prepared. Gd was used since it is the rare earth with the potential closest to the actinides and therefore will be the rare earth most difficult to separate from the actinides. Neodymium was used since it is the rare earth with the greatest fission yield (it will be the rare earth in greatest concentration in PUREX residue), has the second closest potential to the actinides (it will be the major contaminant in the actinide deposit), and it is the rare earth with the greatest dual valent character (it will be the rare earth with the least predictable chemistry).

A solid Li$_2$Sb anode was used in these tests. Several tests were conducted with each actinide (U, Np, Pu, and Am). In all cases, approximately 99% (from 98.4 to 99.6%) of each actinide was electrochemically removed from the salt electrolyte (LiCl-KCl eutectic).

EXAMPLE 4

Recycle of the Last Portion of the Actinide Deposit to Improve the Overall Purity of the Actinide-Rich Deposit The last 10–20% of the actinide deposit recovered from PUREX residue by the pyrochemical process contains a substantial amount (up to about 90% for Am deposits) of non-actinide rare earth impurity. Re-electrorefining this last 10–20% of the deposit will substantially reduce the impurity content of the overall actinide-rich deposit.

Am is the most difficult material to separate from PUREX residue because Am's electrochemical potential is closest to the rare earth's potentials. It is possible to re-electrorefine the last 10–20% of other actinide deposits, as well at Am, except the improvement in product purity will be less than that for Am. The U and Np electrodeposits are sufficiently pure without recycle, but recycling the last 5% of the Pu deposit would improve the overall Pu-rich product purity about 3% (from 95.3% Pu to 98.6% Pu).

EXAMPLE 5

Multiple Steps Utilizing a Solid Anode and a Solid Cathode for at Least One of the Electrorefining Steps Mixed actinide tests were run utilizing two steps. In the first step, the actinides are removed from the molten liquid molten metal anode. In the second step, the remaining actinides which are in the molten salt solvent are removed from the salt. During actinide removal from the anode, a solid Ta wire contacted the liquid Cd anode containing the mixed actinides. The actinides are transferred electrochemically through the molten salt and plated out on a solid Ta cathode.

In the second step, the actinides are electrochemically transferred out of the salt and plated on a solid Ta cathode. Different anodes have been used for this step. In several runs a solid $Li_2Sb$ anode was used. In other tests, a solid $Li_2Sb$ anode was used followed by a solid wire anode. In another run Ce metal additions were made to the liquid Cd anode so that it could continue to be used as the anode during the salt stripping.

The initial composition was essentially the same for all tests. For final compositions (anode stripping and salt stripping), in most cases U, Np, and Pu were stripped to a concentration below their limit of detection. Since Am is more difficult to strip from either the Cd anode or the salt than U, Np, or Pu, the actual stripping efficiency of U, Np, and Pu from the Cd anode and salt can be assumed to be greater than that of Am, i.e., in one run the stripping efficiency of Am was >99.5% and 99.3% respectively from the anode and salt. Thus the actual stripping efficiency for U, Np, and Pu can be assumed to be >99.5% and 99.3% for the anode and salt respectively.

EXAMPLE 6

Use of $Li_2Sb$, LiAl, Graphite and Iron Anodes and Fe, Ta, and U/Ta Cathodes

LiAl anodes were used for several potential measurement experiments for U, Np, Pu and Am. In these tests, the concentration of actinides was reduced between one and two orders of magnitude (from about 1 wt % to about 0.01 Wt %). The goal of these tests was to measure potential as a function of concentration and not salt stripping; therefore in many cases the salt was only stripped by 95 to 98%. Several tests were run for each element and the degree of stripping varied from test to test.

The rare earth metals (particularly Y and La) make effective anodes because once dissolved electrochemically from the anode, they preferentially remain in the salt while the actinides are deposited electrochemically at the cathode.

EXAMPLE 7

Dissolution of Material to be Electrorefined in Molten Electrorefining Media

In several of the foregoing examples, the actinides were dissolved as metals in molten Cd and the rare earths were dissolved as chlorides in molten salt primarily because very pure actinide metals and very pure rare earth chlorides were used. As soon as the Cd and salt solvents containing actinides or rare earths are melted together and stirred, the actinides and rare earths equilibrate (some actinides are oxidized to chlorides and dissolved in the salt and a corresponding amount of rare earths are reduced to metals and dissolved in the molten Cd).

The foregoing examples are to be considered as merely illustrative of the present invention and not as restrictive thereof. Variations and specific materials and techniques may be made by those skilled in the art in the light of the present disclosure, which are to be considered to be within the scope of the present invention. The present invention therefore should be understood to be limited only as is indicated in the appended claims.

We claim:

1. In a pyrochemical process for the separation of actinides and rare earth elements from reprocessed spent nuclear fuel in which electrorefining is utilized for said separation, the improvement wherein said electrorefining is accomplished in one or more steps utilizing both a solid anode selected from lithium aluminide, lithium antimonide, iron, graphite and lanthanum, and a solid cathode selected from tantalum, iron, and uranium-coated tantalum for at least one of such electrorefining steps.

2. The process according to claim 1 wherein the spent nuclear fuel to be electrorefined is prior dissolved in a molten electrorefining medium.

3. The process according to claim 2 wherein the molten electrorefining medium consists essentially of lithium chloride-potassium chloride eutectic.

4. The process according to claim 1 wherein multiple electrorefining steps are utilized to obtain more complete electrochemical separation of said actinides and rare earth elements than can be obtained utilizing a single electrorefining step.

5. The process according to claim 4 wherein in one of said multiple electrorefining steps the anode consists of lithium antimonide and the cathode consists of iron, and wherein in another one of said steps the anode consists of molten metal and the cathode consists of iron.

6. The process according to claim 4 wherein in one of said multiple electrorefining steps the anode consists of lithium antimonide and the cathode consists of iron, and wherein in another one of said steps the anode consists of graphite and the cathode consists of tantalum.

* * * * *